(12) United States Patent
Chang

(10) Patent No.: US 9,562,309 B2
(45) Date of Patent: Feb. 7, 2017

(54) DOUBLE DRIVE TRANSMISSION METHOD, MECHANISM, WASHING MACHINE AND WASHING METHOD

(71) Applicant: CHANGZHOU MACHINE MASTER CO., LTD., Changzhou (CN)

(72) Inventor: Chen Chang, Changzhou (CN)

(73) Assignee: Changzhou Machine Master Co., Ltd., Changzhou (CN)

( * ) Notice: Subject to any disclaimer, the term of this patent is extended or adjusted under 35 U.S.C. 154(b) by 0 days.

(21) Appl. No.: 14/403,063

(22) PCT Filed: Jan. 28, 2013

(86) PCT No.: PCT/CN2013/071056
§ 371 (c)(1),
(2) Date: Nov. 21, 2014

(87) PCT Pub. No.: WO2013/174157
PCT Pub. Date: Nov. 28, 2013

(65) Prior Publication Data
US 2015/0152583 A1     Jun. 4, 2015

(30) Foreign Application Priority Data

May 24, 2012  (CN) .......................... 2012 1 0164423
Aug. 14, 2012  (CN) .......................... 2012 2 0402111
Sep. 11, 2012  (CN) .......................... 2012 1 0335339

(51) Int. Cl.
*F16H 1/32*     (2006.01)
*D06F 17/08*     (2006.01)
(Continued)

(52) U.S. Cl.
CPC ............... *D06F 17/08* (2013.01); *D06F 37/30* (2013.01); *F16H 1/32* (2013.01); *F16H 3/70* (2013.01);
(Continued)

(58) Field of Classification Search
CPC ............ F16H 1/32; F16H 1/321; F16H 37/12; F16H 2001/327; D06F 14/08; D06F 37/30
(Continued)

(56) References Cited

U.S. PATENT DOCUMENTS 2,964,974 A * 12/1960 Loutrel ................... D06F 37/40
477/182
3,352,176 A * 11/1967 Brundage ............... D06F 37/30
192/18 R
(Continued)

FOREIGN PATENT DOCUMENTS

CN     201268791 Y     7/2009
CN     102212947 A     10/2011
(Continued)

*Primary Examiner* — Roger Pang
(74) *Attorney, Agent, or Firm* — Greer, Burns & Crain, Ltd.

(57) ABSTRACT

A double-drive transmission washing machine and method comprising: fixedly connecting an input part of a speed reduction mechanism to a power part for providing rotational driving power; fixedly connecting a spinning output part of the speed reduction mechanism to a spin tube of the washing machine; connecting a agitating output part of the speed reduction mechanism to a wash shaft of the washing machine; by means of connecting the agitating output part to the input part, the agitating output part revolves around an axis of the power part; and by means of meshing connection between the spinning output part and the agitating output part, the spinning output part and the agitating output part are interacting with each other, but rotate separately drive the wash shaft and the spin tube to rotate individually. This washing machine has the rotation speed of the wash shaft vary according to the washing load.

11 Claims, 12 Drawing Sheets

(51) Int. Cl.
*D06F 37/30* (2006.01)
*F16H 37/12* (2006.01)
*F16H 3/70* (2006.01)

(52) U.S. Cl.
CPC ............... *F16H 37/12* (2013.01); *F16H 1/321* (2013.01); *F16H 2001/325* (2013.01); *F16H 2001/327* (2013.01); *Y10T 29/49464* (2015.01)

(58) Field of Classification Search
USPC .. 74/83, 665 F, 665 G, 665 K; 475/163, 174, 475/149, 150; 68/180, 141
See application file for complete search history.

(56) References Cited

U.S. PATENT DOCUMENTS

| | | | | |
|---|---|---|---|---|
| 4,255,952 A | * | 3/1981 | Johnson | D06F 37/40 192/18 R |
| 4,317,343 A | * | 3/1982 | Gerry | D06F 37/40 192/18 R |
| 4,969,341 A | * | 11/1990 | Burk | D06F 37/40 192/108 |
| 5,269,160 A | * | 12/1993 | Wood | D06F 37/40 68/23.7 |
| 5,522,242 A | * | 6/1996 | Hauser | D06F 37/40 192/12 BA |
| 6,202,451 B1 | * | 3/2001 | Park | D06F 37/40 68/133 |
| 7,251,962 B2 | * | 8/2007 | Lim | D06F 37/40 310/51 |
| 2015/0107382 A1 | * | 4/2015 | Chang | D06F 17/08 74/17 |
| 2015/0159312 A1 | * | 6/2015 | Liu | D06F 37/30 74/332 |

FOREIGN PATENT DOCUMENTS

| | | |
|---|---|---|
| CN | 102677427 A | 9/2012 |
| CN | 102684377 A | 9/2012 |
| CN | 102142734 A | 4/2013 |
| WO | WO2013/174158 A1 | 11/2013 |

* cited by examiner

DOUBLE DRIVE TRANSMISSION METHOD, MECHANISM, WASHING MACHINE AND WASHING METHOD

This application is a U.S. National Stage under 35 U.S.C. §371 of International Application No. PCT/CN2013/071056, filed Jan. 28, 2013 which claims its priority to CN 201210164423.8 filed May 24, 2012, CN 201220402111.1 filed Aug. 14, 2012 and CN 201210335339.8 filed Sep. 11, 2012, the entire disclosures of which are incorporated herein by reference.

TECHNICAL FIELD

The present application relates to the technical field of washing machine technical field, and particularly to a double drive transmission method, mechanism, washing machine and washing method.

BACKGROUND

Washing machine is a machine that can wash clean the clothes by chemical decomposition and mechanical impact function. It mainly uses driving device to drive impeller to rotate for agitating water and clothes, thereby achieving the function of washing clothes clean. The conventional driving device as power source is motor, the output shaft of motor transfers the torque from motor rotation to the reduction device. It connects the output shaft of reduction device to impeller, thereby achieving to make impeller to rotate.

As the speed of normal motor is quite high, in order to have suitable output speed, the speed of motor needs to be slow down in actual application. Now the normal method is to reduce the speed of motor by the level one pulley of the reducer. In reducer, it can setup one level or more levels gear reduction mechanism to achieve the reduction in certain ratio. This structure is not only complicated, but also occupied large space. To address the above technical issue, some current applied solution is to remove pulley and connect the motor and reducer directly, but due to that the motor itself and the reducer still in individual position, so they occupies mounting space separately. Therefore, the structure is not compact enough, and the volume is quite large.

To address the abovementioned technical issue, one type of external rotor motor assembly is provided according to the disclosed No. CN102142734A of China invention, which includes motor body, driving shaft, and transmission device. The driving shaft is fixed on the transmission device, motor itself directly drives the driving shaft, the motor body has inner diameter space, and the transmission device is mounted within the inner diameter space. Although the structure has already reduced the occupied space in certain extent, its principle is to use the inner circumference space of the stator of the outer rotor motor for mounting the transmission device to the inner diameter space of stator by mounting parts. So it cannot be applied to the inner rotor motor without the inner space, so it has certain limitation. Meanwhile, its motor itself directly drives the driving shaft, and then to reduce the speed of driving shaft by the transmission device mounting within the inner diameter space of motor. so it only reduces the occupied space in certain extent, but the structure is not compact enough. Further, when the transmission device needs to achieve higher gear ratio and needs to increase the volume, it certainly needs to make the inner diameter of the outer rotor motor to increase the volume to realize this application. Therefore, it obviously does not solve the real technical problem.

In addition, the current washing machines all carry out washing in a certain fixed speed, no matter the washing load is big or small, the wash shaft still rotates at the same speed to wash, this kind of washing method not only can easily damage the washing clothes, but also it can damage the motor of washing machine if overloaded.

SUMMARY

An object of the present application is to provide a double drive transmission device, mechanism, washing machine and washing method, which can change the rotation speed of wash shaft according to the washing load.

According to the first aspect of the present application, it provides a double drive transmission output method for a washing machine, comprising steps in the following sequences:

fixedly connecting an input part of a speed reduction mechanism to a power part for providing rotational driving power;

fixedly connecting a spinning output part of the speed reduction mechanism to a spin tube of the washing machine;

connecting a agitating output part of the speed reduction mechanism to a wash shaft of the washing machine;

by means of connecting the agitating output part to the input part, the agitating output part revolves around an axis of the power part;

by means of meshing connection between the spinning output part and the agitating output part, it allows the spinning output part and the agitating output part to be interacting with each other, and to rotating separately on their own axis. so as to drive the wash shaft and the spin tube to rotate individually.

Preferably, the method further comprising following steps:

during rotation of the wash shaft, the wash shaft transfers a reactive force from a washing load to the agitating output part; and the agitating output shaft transfers the reactive force from the washing load to the spinning output part, then the interaction force between the agitating output part and the spinning output part is changed, so individual rotation speed of the agitating output part and the spinning output part varies with the washing load.

Preferably, the transmission way among the input parts of the speed reduction mechanism, the agitating output parts, and the spinning output parts are provided in plane.

Preferably, wherein the power parts are a motor rotor or a pulley which has respectively a driving frame and a cavity within the driving frame. Certainly, the above rotation body can use other transmission connected rotation parts like gear or sprockets.

Preferably, the input part of the speed reduction mechanism is an eccentric sleeve which is mounted in the cavity, and connected to the driving frame and rotates around the wash shaft.

Preferably, the agitating output part comprising:

a spur gear which is sleeved outside of the eccentric sleeve and connected rotationally to it, which revolves around the axis of the eccentric sleeve with rotation of the eccentric sleeve;

a connection device which connects the spur gear to the wash shaft or the spin tube.

The spinning output part is a ring gear which is connected to the spin tube or the wash shaft, and in which the spur gear is placed so that during revolution, the spur gear rotates on its own axis as a result of its meshing with teeth of the ring gear, and drives the ring gear to rotate by itself.

Preferably, the input part is mounted in the driving frame, and comprises an input gear shaft being mounted on a position that deviating from the axis of the driving frame, and an input gear connecting to the input gear shaft.

Preferably, the agitating output part is an output gear meshing with the input gear; the spinning output part is an intermediate driving gear locating outside of the driving frame and meshing with the input gear.

When the power part is motor rotor, and the driving frame is the rotor frame; when the power part is pulley, the driving frame is the frame of pulley. Specifically, the rotor frame and the pulley frame integrated as one part, and also can be assembled as one part.

According to the second aspect of the present invention, a double drive transmission device of a washing machine, including a speed reduction mechanism being provided with an input part, a spinning output part and an agitating output part, wherein:

the input parts fixedly connects to a power part which provides a rotation driving power;

the spinning output part fixedly connects to a spin tube of the washing machine;

the agitating output parts fixedly connects to the wash shaft of the washing machine;

the agitating output part fixedly connects to the input part, so that the agitating output part revolves around the axis of the power part;

the spinning output part meshes with the agitating output parts so that the spinning output part and the agitating output part interacts with each other and rotates separately around their own axis, as a result driving the wash shaft and the spin tube to rotate individually.

Preferably, wherein the power part is a motor rotor or a pulley which has respectively a driving frame and an empty cavity inside the driving frame.

Preferably, the input part is an eccentric sleeve which is mounted inside the empty cavity, and connected to the motor rotor or the pulley, and rotates around the wash shaft.

Preferably, the agitating output part comprising:

a spur gear which is sleeved on an outside of the eccentric sleeve and rotationally connected to it, revolving around the axis of the eccentric sleeve with the rotation of eccentric sleeve;

a connection device which connects the spur gear to the wash shaft or the spin tube.

Preferably, the spinning output part is a ring gear that is connected the spin tube or the wash shaft, and inside of which the spur gear is placed, so that during revolution, the spur gear rotates on its owns axis as a result of its meshing with the internal teeth of the ring gear, and drives the ring gear to rotate by itself.

According to the third aspect of the present invention, the washing machine comprising the device mentioned above.

According to the forth aspect of the present invention, a method comprising using the method or device mentioned above to wash clothes.

Compared with the current technology, the driving device of washing machine in the present application shall have the advantages as follows:

1) It can adjust the rotation speed of wash shaft according to the change of washing load, which can reduce or prevent the damage to washing clothes, and can avoid to incur the burn up accident due to the overload of motor of washing machine.

2) The washing machine driving device in the present application is to put the speed reduction device inside the rotation body, which can best use of the internal space of rotation body, so it reduces the volume of driving device, thereby it is beneficial for washing machine in small size.

3) The spur gear of the speed reduction mechanism in the present application revolves with the eccentric sleeve, but also mesh engaged with the ring gear to rotate by itself, thereby it allows wash shaft and spin tube to rotate in opposite direction at the same time, and it reduces energy consumption of motor and also decrease the noise;

4) The present application uses connection device to connect spur gear to wash shaft or spin tube, which allows the eccentric torque that deviated from the axis of rotation body got by the spur gear rotating together with eccentric sleeve to be transferred to the torque as the axial as axis of rotation body, due to that the transmission parts is less, the transmission efficiency is high, structure is compact, volume is small, and mounting and using is convenient;

5) The present application treats the rotation body providing power as one part of washing machine driving device, and rotation body can be motor rotor, or pulley, which not only makes the structure of washing machine driving device more compact, and the occupied space is much smaller, but also saves the usage of lots of connection parts, thereby it reduces the production cost of washing machine further.

Now the present application is described in detail in conjunction with drawings and embodiment hereinafter.

Explanation for the marks shown in drawings: 1—Housing assembly; 2—Stator; 3—Internal rotor; 4—Eccentric sleeve; 5—wash shaft; 6—Spur gear; 7—Ring gear; 8—Connection device; 9—Clutch coil device; 11—Housing; 12—End cover of motor; 13—Motor bolts; 14—Mounting disc, 20—Spin tube; 31—Driving frame; 32—Internal cavity; 33—Teeth engaged; 34—Rotor; 35—Rotor inserts; 351—round tube; 352—Base; 41—Body of eccentric tube; 42—The first tube; 43—The second tube; 44—Through hole; 411—external extended margin; 40—axis of spur gear; 50—axis of wash shaft; 51—Input gear shaft; 52—the first input gear; 53—Intermediate gear; 54—the second input gear; 55—output gear; 60—External teeth; 62—Gear groove; 61—connection shaft hole; 63—Steel ring; 71—the upper connection part; 72—the lower connection part; 201—shaft tube groove; 711—External spline; 712—tab groove; 721—Internal teeth; 722—tab with hole; 723—rib; 81—body of connection plate; 82—through hole; 83—connection shaft; 84—round tube; 85—cross slipper; 86—positioning slipper; 851—body of round disc; 852—the lower tab; 853—the upper tab; 861—body of slipper; 862—ear plate; 863—tab groove; 100—bearing; 200—spring; 91—slider; 92—electromagnetic coil; 93—coil frame; 94—coil holder; 911—internal spline; 912—magnetic iron ring; 913—teeth groove.

DETAILED DESCRIPTION

An object of the present application is to provide one type of washing machine driving device and the washing machine with the washing machine driving device, which has small axial dimension, compact structure, and small occupied space.

Figure 1:
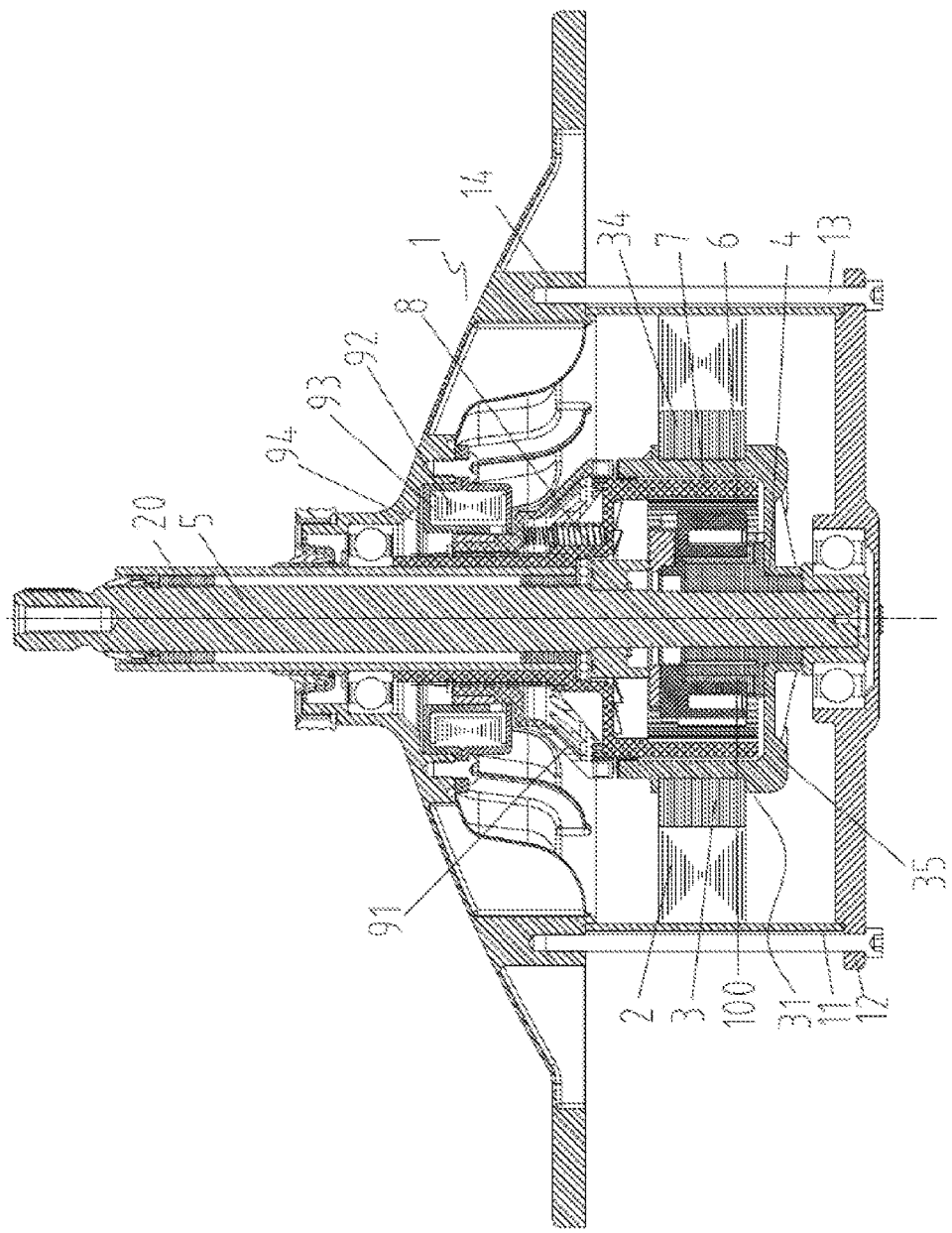
FIG. 1 is a schematic view showing the structure of washing machine driving device according to a first embodiment of the present application.
Figure 7:
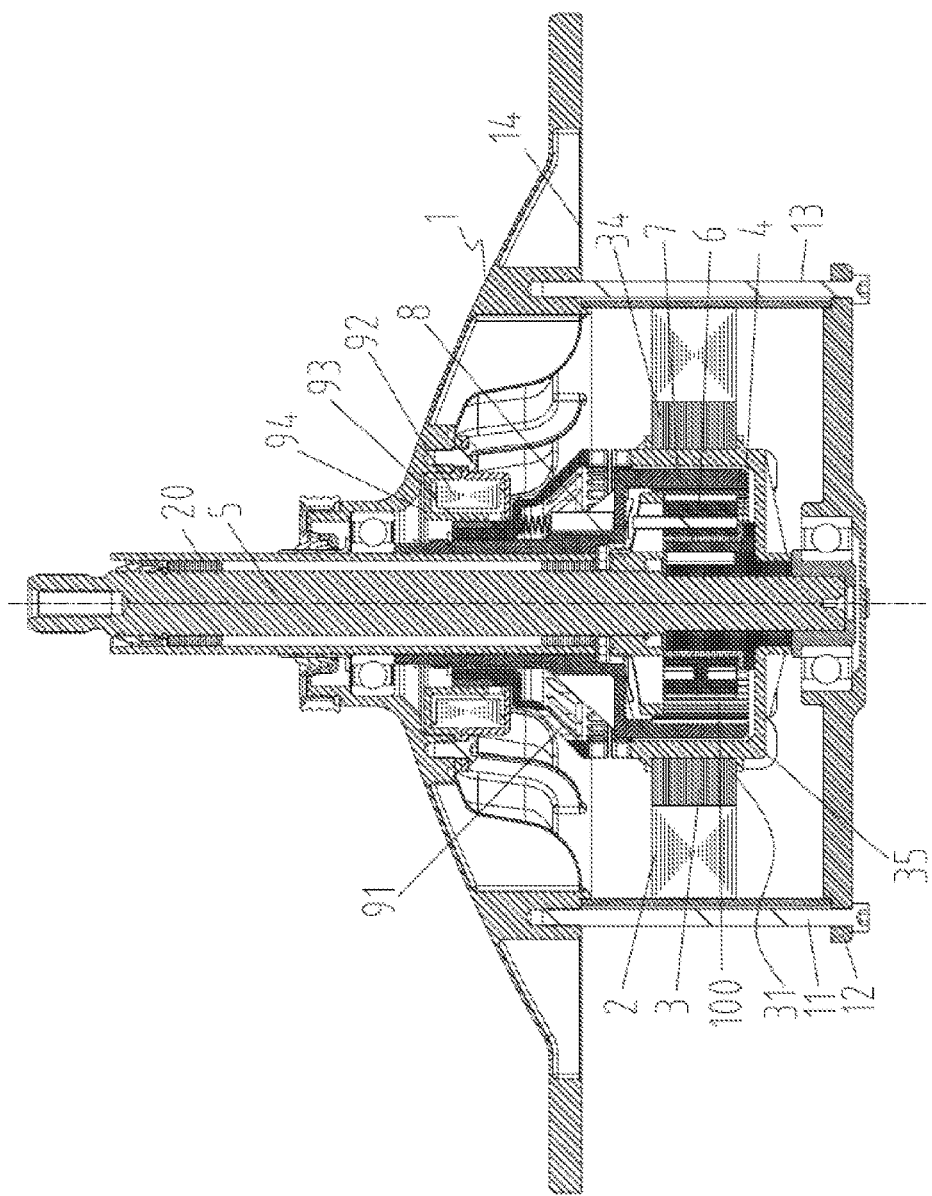
FIG. 7 is a schematic view showing the structure of washing machine driving device according to a second embodiment of the present application.
Figure 17:
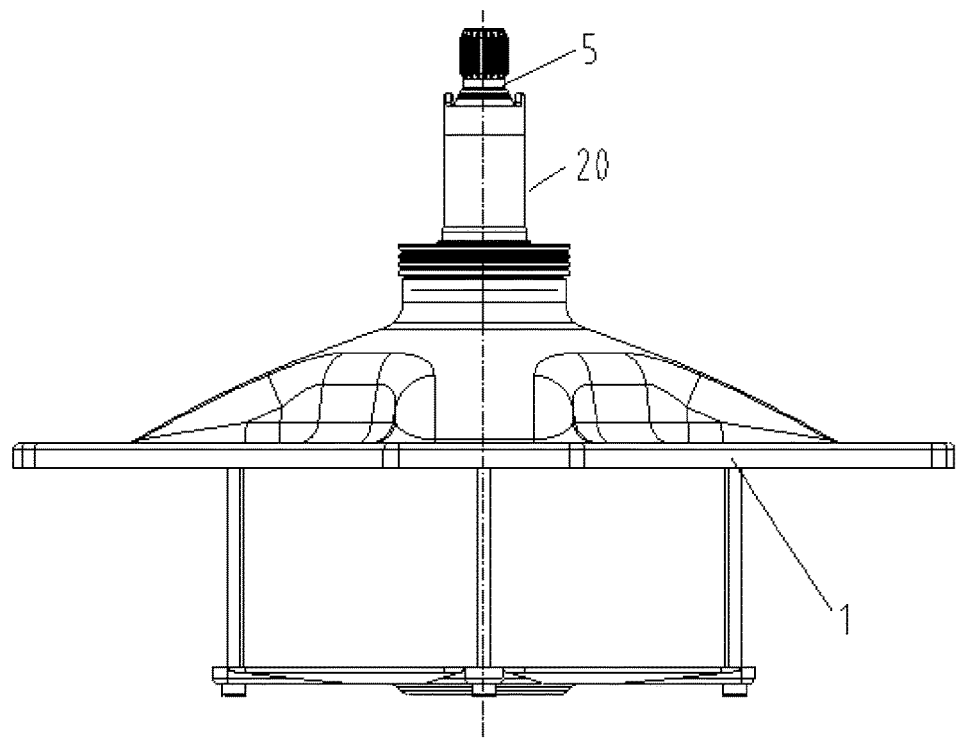
FIG. 17 is a front view showing the washing machine driving device of the present application.

FIG. 17 is a top view showing the washing machine driving device of the present application, and FIGS. 1 and 7 are the sectional view showing the two embodiment of the washing machine driving device as shown in FIG. 17. As shown in FIGS. 1 and 7, the washing machine of the present application comprising: the rotation body without shaft that providing rotation power; the speed reduction device mounting on the rotation body, and it obtains the rotation power from the center position of rotation body, and it outputs the force at the rotation speed equal to or lower than the speed of rotation body; the wash shaft and spin tube that connected to speed reduction device, which transfers the power from the rotation speed equal to or lower than the speed of rotation body under the power of speed reduction device separately supplied to the washing execution part and spinning execution part of washing machine; wherein, spin tube sleeved on the outside of wash shaft and also rotation connected to wash shaft.

The rotation body that providing rotation power in the present application is motor rotor or pulley, they both have driving frame (like motor rotor frame or pulley frame) and setting inside the empty cavity of driving frame. Motor rotor can either be the internal rotor of motor or the external rotor of motor, to be easily understood, the embodiment in the present application only explains the internal rotor of motor. That is to understand, the persons skilled in this technical field also can take the technical solution described in the present application for example, to replace the motor internal rotor mentioned in this embodiment with motor external rotor or pulley, also, if replacing it for changing to the structure of the present application correspondingly does not have novelty of this patent.

The present application can also use different kinds of motor, like synchronous motor, asynchronous motor, Servo motor, PSC motor, BLDC motor and etc.

A washing machine double drive transmission device provided in the present application comprises speed reduction mechanism, which comprising input part, spinning output part and agitating output part, wherein:

the input parts fixedly connects to a power part which provides a rotation driving power (that is the above rotation body without shaft);

the spinning output part fixedly connects to a spin tube of the washing machine;

the agitating output parts fixedly connects to the wash shaft of the washing machine;

the agitating output part fixedly connects to the input part, so that the agitating output part revolves around the axis of the power part;

the spinning output part meshes with the agitating output parts so that the spinning output part and the agitating output part interacts with each other and rotates separately around their own axis, as a result driving the wash shaft and the spin tube to rotate individually.

In one embodiment, the power part in the present application is driving frame or the driving frame with empty cavity. The input part is an eccentric sleeve which is mounted inside the empty cavity, and connected to the motor rotor or the pulley, and rotates around the wash shaft. The agitating output part comprising: a spur gear which is sleeved on an outside of the eccentric sleeve and rotationally connected to it, revolving around the axis of the eccentric sleeve with the rotation of eccentric sleeve; a connection device which connects the spur gear to the wash shaft or the spin tube. The spinning output part is a ring gear that is connected the spin tube or the wash shaft, and inside of which the spur gear is placed, so that during revolution, the spur gear rotates on its owns axis as a result of its meshing with the internal teeth of the ring gear, and drives the ring gear to rotate by itself.

On the other hand, the double drive transmission output method for a washing machine, comprising steps in the following sequences:

fixedly connecting an input part of a speed reduction mechanism to a power part for providing rotational driving power;

fixedly connecting a spinning output part of the speed reduction mechanism to a spin tube of the washing machine;

connecting a agitating output part of the speed reduction mechanism to a wash shaft of the washing machine;

by means of connecting the agitating output part to the input part, the agitating output part revolves around an axis of the power part;

by means of meshing connection between the spinning output part and the agitating output part, it allows the spinning output part and the agitating output part to be interacting with each other, and to rotating separately on their own axis. so as to drive the wash shaft and the spin tube to rotate individually.

During rotation of the wash shaft, the wash shaft transfers a reactive force from a washing load to the agitating output part; and the agitating output shaft transfers the reactive force from the washing load to the spinning output part, then the interaction force between the agitating output part and the spinning output part is changed, so individual rotation speed of the agitating output part and the spinning output part varies with the washing load. That is, when the washing load increases, the self rotation speed of spinning output part also increases accordingly which also reduces the self rotation speed of agitating output part. further, when the washing load decreases, the self rotation speed of spinning output part also decreases accordingly which also increases the self rotation speed of agitating output part.

Especially, the transmission way among the input part of speed reduction mechanism, agitating output part and spinning output part are provided in plane for reduction operation.

As shown in FIGS. 1, 2, 7 and 8, the power part of the present application is driving frame or equipped with driving frame and the driving frame with empty cavity 3. The input part of speed reduction mechanism is the eccentric sleeve 4 that mounting inside the driving frame 3, connecting to the driving frame 31 and rotating around the wash shaft 5. The agitating output part comprising: the spur gear 6 sleeved outside of eccentric sleeve 4 and rotation connected to eccentric sleeve, and it revolves around the axis of eccentric sleeve 4 with the rotation of eccentric sleeve 4; the connection device that connects spur gear 6 to wash shaft 5. The spinning output part is the ring gear 7 that connects the spin tube 20, and the spur gear 6 is setting inside the ring gear, which allows the spur gear 6 to mesh engaged to the internal teeth of ring gear 7 during the revolution period, thereby it drives the ring gear to rotate by its elf.

Figure 19:
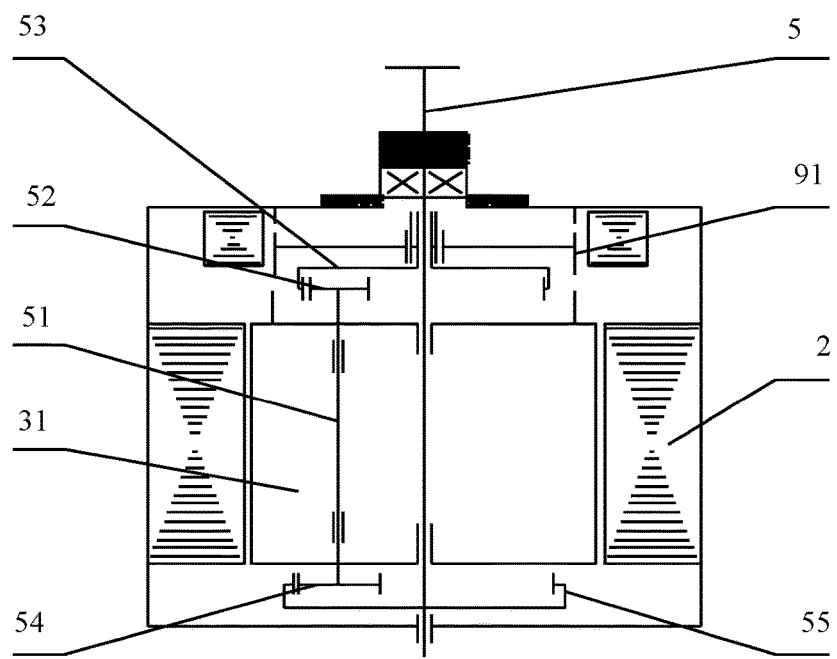
FIG. 19 is a schematic view showing the work theory of the washing machine driving device according to a third embodiment of the present application.

As shown in FIG. 19, the power part of the present application is driving frame, the input device mounting in the driving frame 31, and the input part comprising the input gear shaft 51 that mounting at the position deviated from the axis of driving frame and the input gear that connects to input gear shafts including the first input gear 52 and the second input gear 54. The agitating output part is the output gear 55 that mesh engaged with the second input gear 54 of the input gear; spinning output part is the intermediate gear 53 that locates outside driving frame and mesh engaged with the first input gear 52 of input gear.

In the present application, the internal rotor of motor provides the rotation power by rotating around its own axis, the speed reduction mechanism setting inside the internal rotor can change the output speed of internal rotor, due to that the speed reduction mechanism connects to the internal rotor, the speed reduction mechanism can obtain rotation power during the internal rotor rotating around its axis. Due to that the eccentric sleeve of speed reduction mechanism connecting to internal rotor rotates around axis of internal rotor eccentrically, which allows other parts of speed reduction mechanism can rotate around the axis of internal rotor eccentrically, and also the power from the eccentric rotation is transferred to the output power where the rotation speed is equal to or lower than the speed of internal rotor. As the speed reduction mechanism connects to wash shaft, and one end of wash shaft connects to impeller of washing machine (or agitator, will not repeat this hereinafter, and does not show this in Figure), and the spin tube 20 sleeved outside the wash shaft and it is rotation connected to wash shaft, and spin tube connects to basket of washing machine (it does not show this in Figure), therefore, under the function of output power of speed reduction mechanism, wash shaft and spin tube provide the power from the rotation speed that equal to or lower than the speed of internal rotor individually to the corresponding execution parts, thereby it results that the washing machine mounting with the washing machine driving device in the present application can achieve the function of washing clothes.

In the present application, as shown in FIGS. 17, 1 and 7, the stator 2 is setting inside the housing assembly 1, and the internal rotor 3 is setting inside the stator 2 that providing rotation power. The internal rotor in the present application comprising driving frame 31 and the empty cavity 32 setting inside the driving frame, so the rotation speed of internal rotor is the speed of driving frame, and also the rotation axis of driving frame is symmetric axis. In which, the speed reduction mechanism mounts inside the empty cavity of driving frame, and the speed reduction mechanism comprising the transmission device, and the transmission device comprising: the spur gear 6 that sleeved outside of eccentric sleeve and it rotation connects to eccentric sleeve, and it revolves around the axis of driving frame with the rotation of eccentric sleeve; the ring gear 7 that connects to spin tube 20, and the spur gear is setting inside the ring gear, which allows the spur gear is mesh engaged with the internal teeth of ring gear to rotate by itself during the revolution period, and thereby the ring gear rotates accordingly during the process that mesh engaged with the spur gear, and also it transfers the power from rotation to spin tube; in which, the spur gear connects to wash shaft 5 by connection device, so it transfers the power from rotation to wash shaft. Otherwise, the speed reduction mechanism in the present application also comprises the clutch coil assembly that controls the output speed of speed reduction device, and it is setting inside the housing assembly, and it is axially sliding sleeved on the external wall of ring gear, and it is teeth engaged or disengaged with the teeth at one end of driving frame by sliding in axial direction, thereby it drives the rotation speed output by speed reduction mechanism to be equal to or lower than the rotation speed of driving frame.

The transmission device in the present application, the spur gear connects to wash shaft by using the connection device, and the structure of connection device has different types, and now the present application is described in detail in conjunction with embodiment hereinafter.

The First Embodiment of the Present Application

Figure 2:
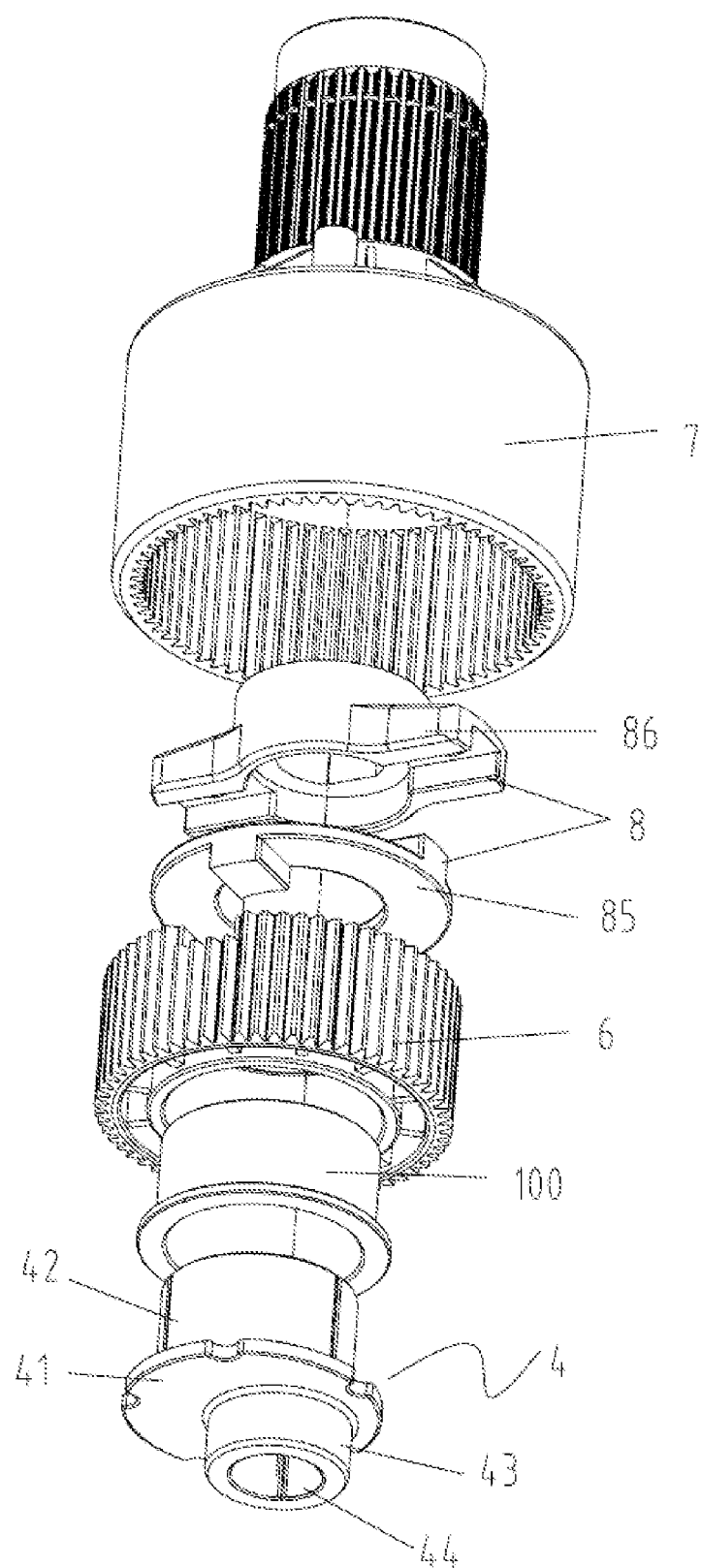
FIG. 2 is an exploded view showing the speed reduction device (excluding the clutch coil assembly) according to a first embodiment of the present application.

As shown in FIGS. 1 and 2, they are schematic view showing the structure of the washing machine device in the present application where the connection device is slipper.

As shown in FIG. 1, the motor in this embodiment is internal rotor motor. In which, the housing assembly comprising: tube housing 11 that opened holes at two ends, the end cover of motor that connects to the bottom of housing 11, the mounting disc 14 at the top of housing and connects with the end cover of motor 12 by motor bolts 13, and the housing 11, the end cover of motor 12 and the mounting disc 14 enclosed as an internal space for setting stator 2, internal rotor and other parts.

Figure 12:
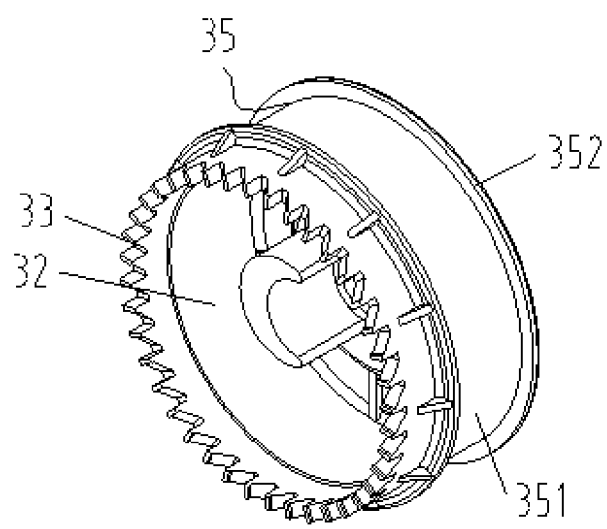
FIG. 12 is a schematic view showing the structure of rotor housing of the present application.

The internal rotor in the embodiment of the present application comprising the driving frame 31 and the empty cavity 32 setting inside the driving frame, whose top end has tooth 33. In detail, as shown in FIGS. 1 and 12, the driving frame in this embodiment comprising tube rotor 34 and the rotor insert 35 inside the rotor, and the rotor insert comprising: round tube 351 that opening holes at two ends, the tooth 33 at the top and extents upward; the basement 352 locating the bottom of round tube and opening one hole at the center of basement. The round tube of rotor insert and the basement combines the empty cavity 32 for putting the speed reduction mechanism, and the wash shaft goes through the center of the hold of basement, so when the driving frame rotates, it has the same rotation shaft as the wash shaft, that is, the rotation shaft of driving frame coincides with the rotation shaft of wash shaft.

In this embodiment, as shown in FIG. 2, the speed reduction mechanism setting inside the empty cavity of internal rotor, and the speed reduction mechanism comprising transmission device and clutch coil assembly, and the transmission device comprising eccentric sleeve 4, spur gear 6, ring gear 7 and connection device 8.

Figure 6:
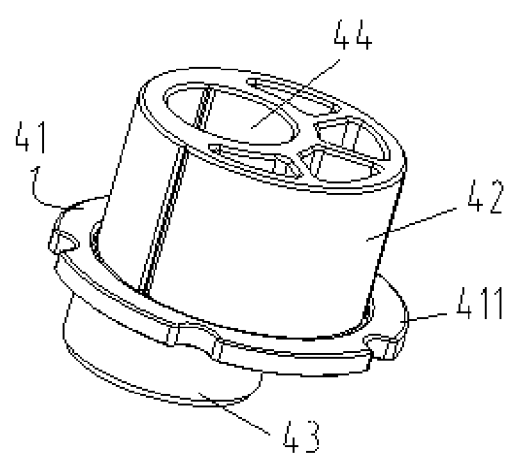
FIG. 6 is a schematic view showing the structure of eccentric sleeve according to a first embodiment of the present application.

The eccentric sleeve of transmission device is fixedly connected to driving frame 31, and eccentric sleeve rotates around the rotation axis of driving frame. As shown in FIG. 6, the eccentric sleeve comprising the first tube that rotates around the same rotation axis as driving frame and the first tube that rotates deviated from the axis of driving frame. Wherein the second tube and the first tube can either be fixedly connected by separate parts or can be fixedly connected by combining one part. In order to be convenient for machining or mounting, preferably, as shown in FIG. 2, the second tube is only the second tube 43, and the first tube comprising the eccentric connection part 41 that connects to the top of the second tube, and the first tube 42 that connects to the top of eccentric connection part, wherein, eccentric connection part 41 has the external extended edge formed by the extending toward outside by the first tube 42, and no eccentric sleeve hole passing through the second tube 43, and the eccentric sleeve hold extends upward and goes through the eccentric connection part and the first tube.

When machining eccentric sleeve, the first tube, eccentric connection part and the second tube can be forming in one part or connecting as one part by welding, and in machining, between the center line of the first tube and the center line of the second tube can have certain eccentric distance, and the eccentric distance can equal to the difference between the radius of spur gear and the radius of ring gear.

In this embodiment, the fixedly connection between eccentric sleeve 4 and the driving frame 3 is the stiffness connection for transferring rotation torque. In machining, the eccentric sleeve and driving frame can be fixedly connection by forming as one part, or can be fixedly connected by combing by separate parts, like connecting by bolts, welding and etc. The preferable method in detail like: the tube rotor 34 uses metal material, eccentric sleeve 4 uses metal material, the tube rotor 34 and eccentric sleeve 4 are put in plastic injection tooling or casting tooling, they are formed as rotor and eccentric sleeve by plastic injection or casting, and they are mounting in the rotor insert 35; more preferably, several grooves (four grooves as shown in FIG. 2) or tab shall be setting at the outside of the extended edges of the eccentric connection part 41 in eccentric sleeve, thereby by increasing the binding force during the plastic injection or casting of eccentric sleeve 4 and driving frame 31, it can meet the requirement that the stiff fixedly connection between eccentric sleeve 4 and driving frame 31.

During the rotation of driving frame, the eccentric sleeve that fixedly connected to the hole of basement of rotor insert by the second tube that rotates around the same axis and at the same speed as driving frame. Thereby it drives the spur gear that rotation connected to the first tube 42 of eccentric sleeve to rotate accordingly.

Figure 5:
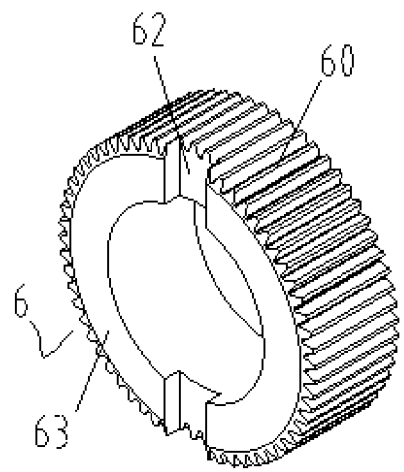
FIG. 5 is a schematic view showing the structure of spur gear according to a first embodiment of the present application.

As shown in FIG. 5, the spur gear 6 in the embodiment of the present application comprising steel ring 63 and the external teeth 60 that formed together as one part by plastic injection, and one pair of grooves 62 that relative in radical direction is setting at the upper end surface of spur gear. Wherein, the steel ring is rotation connected to the first tube of eccentric sleeve, and the way in detail: the external wall of the first tube 42 and the internal circle of bushing 100 are interference fit connected, but the upper end of the external extended edge of eccentric connection part is contact connected with the lower end of the external extended edge of bushing 100; or, the external wall of the first tube 42 and the internal circle of bushing 100 can be clearance fit connected, but the upper end of the external extended edge of eccentric connection part and the lower end of the external extended edge of bushing 100 are contact connected, and the external circle of bushing 100 and the internal wall of spur gear are interference fit connected.

Surely, in order to realize the rotation connection between eccentric sleeve 4 and spur gear, the way applied in detail can like this: to improve the structure of eccentric sleeve 4, like using power metal material, which allows eccentric sleeve 4 has the function of bushing 100 to avoid use the bushing 100 separately, thereby to rotation connect the steel ring to the eccentric sleeve that has the bushing function.

Preferably, several material reducing chutes inside the first tube 42 to reduce the production cost, and the material that has the lubrication function can be added to material reducing chutes like lubrication oil, oil cotton, and increase the service life of eccentric sleeve.

When the eccentric sleeve rotates, the spur gear that rotation connects to the first tube above the eccentric sleeve that revolves in the same rotation direction with the eccentric sleeve. There is a certain eccentric distance between the center line of the first tube of eccentric sleeve and the center line of the second tube, and the rotation axis of the first tube coincides with the axis of driving frame, so when the spur gear is in revolution, actually it rotates around the axis of driving frame eccentrically.

Figure 14:
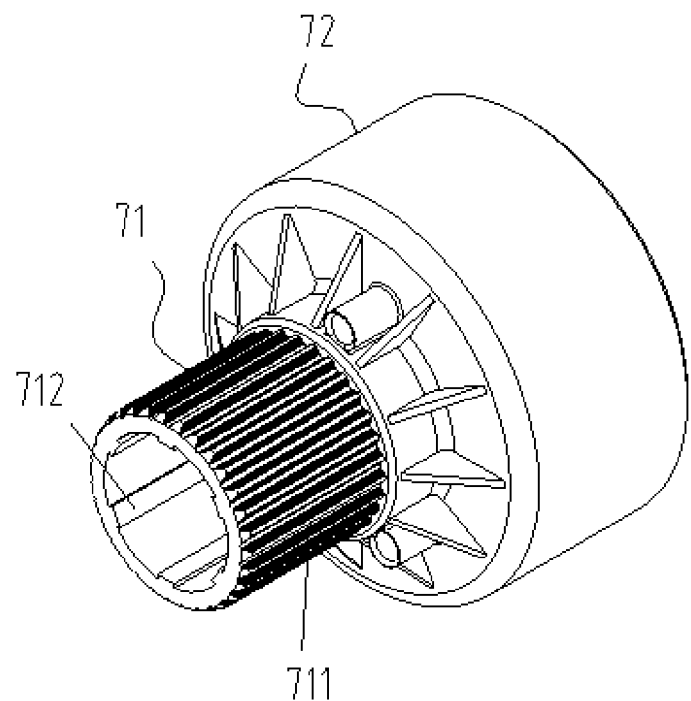
FIG. 14 is a schematic view showing the structure of ring gear of the present application.
Figure 15:
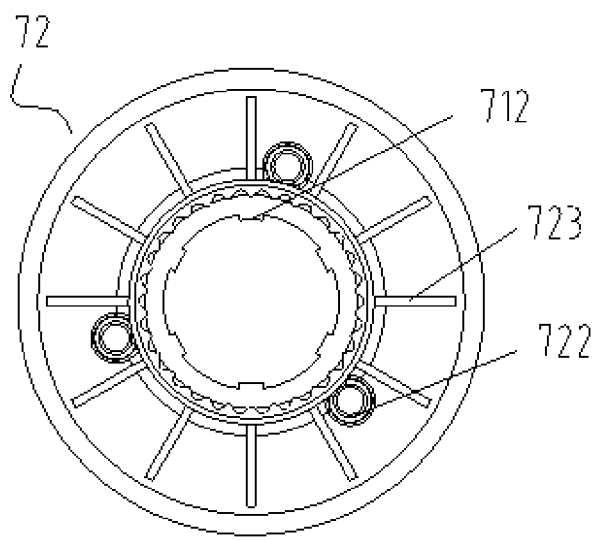
FIG. 15 is a top view showing the ring gear of the present application.

When the spur gear in revolution, due to that the external teeth is mesh engaged with the ring gear, it can transfer its rotation force to ring gear. The ring gear in this embodiment is plastic or metal connection part, the metal or plastic connection part comprising the upper connection part 71 and the lower connection part 72 that under it and connects to the upper connection part. As shown in FIG. 14, the upper connection part is housing, and the external spline 711 sets at the external wall along the axial direction, and many tab 712 sets at its internal wall along the axial direction; the lower connection part 72 is tube structure, its top is fixedly connected to the upper connection part, and the internal teeth 721 installed in its internal wall, and many ribs 723 setting at the connection area between the upper connection part and the lower connection part, and in the adjacent rib 723 sets with the tab 722 with holes for placing springs 200.

Figure 13:
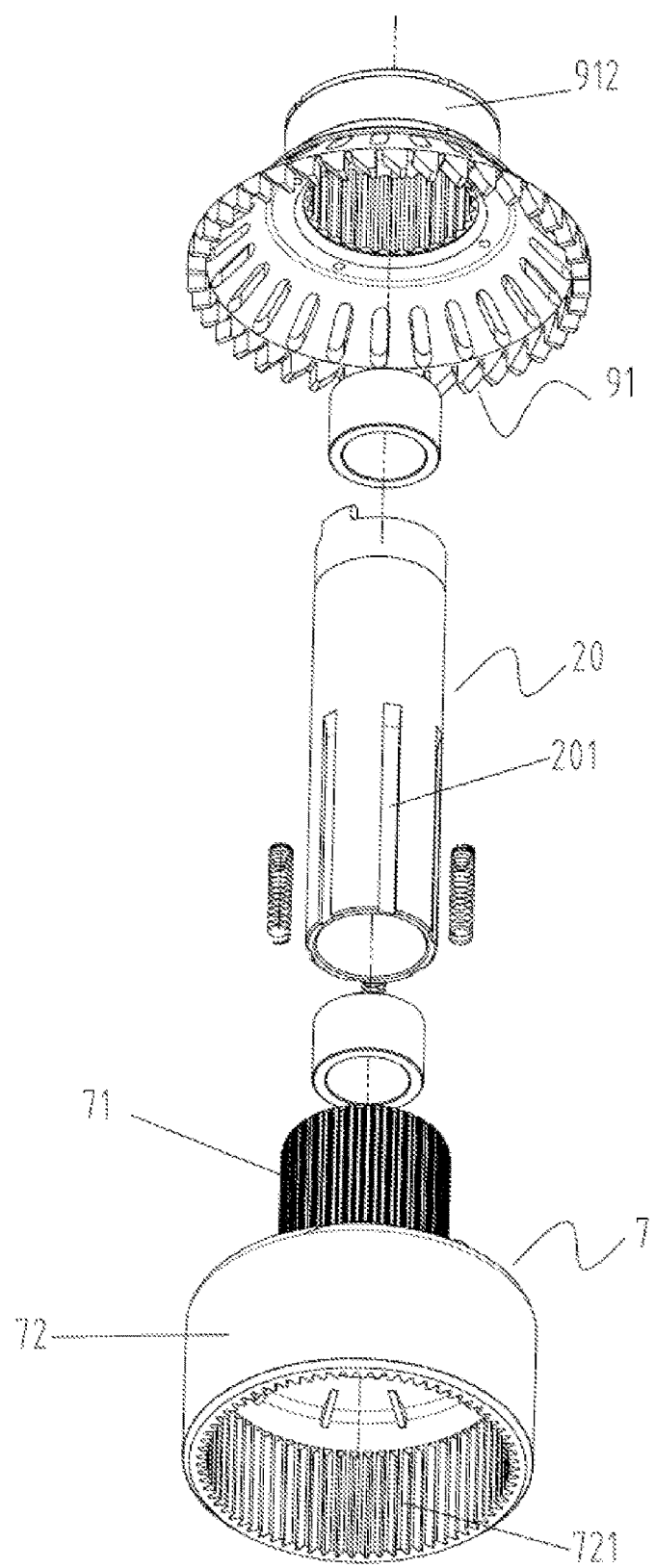
FIG. 13 is an exploded view showing the clutch coil device, spin tube and ring gear part of the present application.

As shown in FIG. 13, many tab in the upper connection part matches with the tube grooves 201 setting at the external wall of spin tube, thereby the ring gear is fixedly connected to spin tube as one part. Moreover, it also can use metal connection part to stiffness connection to spin tube by using laser welding or other ways. In the present embodiment, the internal teeth 721 at the internal wall of the lower connection part 72 can be made of plastic or metal.

When the spur gear is in revolution (that is to rotate around the axis of driving frame eccentrically), its external teeth is mesh engaged with the internal teeth of ring gear, thereby under the interaction force from the mesh engagement, it drives the spur gear to rotate around itself, and the current rotation direction is opposite to the direction of revolution, also due to the differences of the number of teeth between its external teeth and the internal teeth of ring gear, the spur gear can have speed differences during self rotation and revolution, that is the speed of self rotation is lower than the speed of revolution, thereby the rotation output speed is lower than the rotation speed of driving frame. Accordingly, due to that the ring gear and the spur gear have interaction force, the ring gear can rotate when the spur gear is self rotation, but the rotation direction of ring gear is opposite to the self rotation direction of spur gear, that is, the rotation direction of ring gear is the same as the rotation direction of driving frame, and the rotation speed of ring gear is lower than the rotation speed of driving frame.

In conclusion, the spur gear under the function of the rotated eccentric sleeve and the ring gear mesh engaged, can revolve and self rotation at the same time, and the self rotation direction is opposite to the revolution direction, the rotation speed during self rotation is lower than the rotation speed of driving frame; the ring gear under the corresponding action, rotates at the speed lower than rotation speed of driving frame in opposite direction to the self rotation direction of spur gear.

Figure 3:
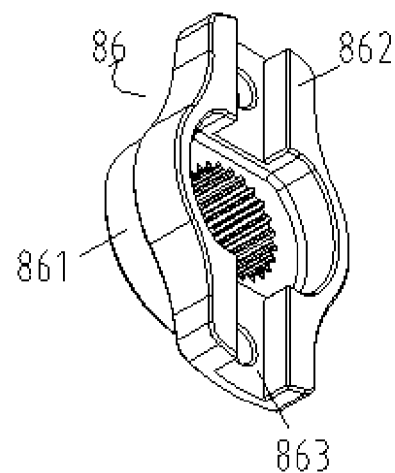
FIG. 3 is a schematic view showing the structure of positioning slipper according to a first embodiment of the present application.
Figure 4:
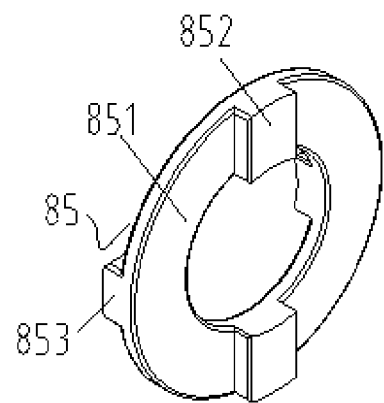
FIG. 4 is a schematic view showing the structure of cross slipper according to a first embodiment of the present application.

When the spur gear rotates at low speed by itself, it transfers the power to wash shaft by sliding structure. The structure of sliding in this embodiment including: the cross slipper 85 that pass through wash shaft, and its lower end surface is sliding connected to the upper end surface of the spur gear; the positioning slipper 86 that sliding connects to the upper end surface of cross slipper, and its center is fixedly connected to wash shaft. Wherein, as shown in FIG. 4, the cross slipper comprising: the round disc body 851 that goes through wash shaft; one pair of the lower tab 852 setting at the lower end surface of round disc body and relative to the radical direction; one pair of the upper tab 853 setting at the upper end surface of round disc body relative to the radical direction, and its extended line and the extended line of one pair of the lower tab are crossed in space. As shown in FIG. 3, positioning slipper comprising: the slipper body 861 in tube shape, its center is fixedly connected to wash shaft; one pair of otic placode 862 setting at two sides of sliding body and along the opposite to radical direction, one pair of grooves 863 that matching with one pair of the upper tab. Preferably, one pair of gear grooves setting at the upper end surface of spur gear and relative to the radical direction, and it corresponds to the position of one pair of the lower tab.

Specifically, as shown in FIG. 5, in this embodiment, one pair of the lower tab in cross slipper 85 setting respectively in one pair of gear grooves 62 at the upper end surface of spur gear, and one pair of the lower tab respectively sliding within one pair of gear grooves in the relative position; one pair of the upper tab in cross sliding 85 respectively setting inside one pair of grooves 863 under the surface of positioning slipper, and one pair of the upper tab can respectively sliding inside one pair of grooves; the center of positioning slipper body is fixedly connected to wash shaft, thereby it drives the center line of positioning slipper to be coincide with the center line of wash shaft.

During the self rotation of spur gear, one pair of gear grooves 62 above it rotates at the same speed in the same direction as spur gear, thereby it drives one pair of the lower tab 852 setting in one pair of gear groove to rotate together, that is, the whole cross slipper rotates with the spur gear, under the centrifugal force, one pair of the lower tab in cross slipper and one pair of the upper tab respectively slides in one pair of gear groove and one pair of groove 863 along the radical direction, and during the sliding process, that is, the sliding process is from the direction of axis 40 of spur gear towards the direction of axis 50 of wash shaft. Due to that one pair of the upper tab in cross slipper sliding setting inside one pair of grooves 863 of positioning slipper, the rotation of tab drives the groove to rotate, that is, the positioning slipper rotates also, due to that the center of positioning slipper is fixedly connected to wash shaft, thereby when the positioning slipper rotates, it drives wash shaft to rotate with spur gear in the same direction at the same speed.

Figure 18:
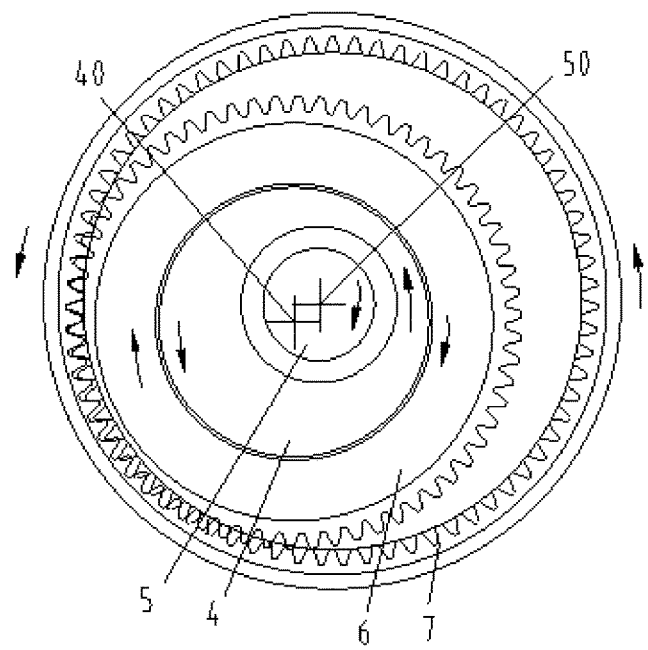
FIG. 18 is a schematic view showing the rotation direction of all parts of wash shaft and speed reduction device of the present application.

As shown in FIGS. 2 and 18, when the spur gear rotates around the axis of wash shaft eccentrically, through the structure of slider, it can transfer the force resulted from the rotation of spur gear around the axis 40 of spur gear to the rotation force of wash shaft around the axis 50 (that is axis of driving frame) of wash shaft, that is, transferring the output from the spur gear that rotates around the axis of wash shaft eccentrically to the output of wash shaft at the same axis.

As the washing machine has different washing conditions, it needs to adjust the output speed of speed reduction mechanism according to the different washing conditions. In washing condition, the output speed of speed reduction mechanism shall be low speed, in spinning condition, the output speed of speed reduction mechanism shall be high speed. So in present embodiment, the speed reduction mechanism comprising one clutch coil device, which setting inside the empty cavity of housing assembly, and sliding sleeved on the outside of external wall of ring gear in axial direction, by engaging or disengaging with the teeth 33 at the end surface of driving frame, it achieves the speed reduction mechanism to run at high or low speed.

Specifically, the clutch coil device in the present embodiment is magnetic clutch coil device, which comprising electromagnetic coil mechanism and slider 91, and the electromagnetic coil mechanism sets outside of slider.

The electromagnetic coil mechanism comprising electromagnetic coil 92, coil frame 93 and coil holder 94. The coil holder is fixedly mounting on the installation plate 14 of housing assembly, and the coil frame mounting inside the coil holder, but the electromagnetic coil sets on the coil frame.

Figure 16:
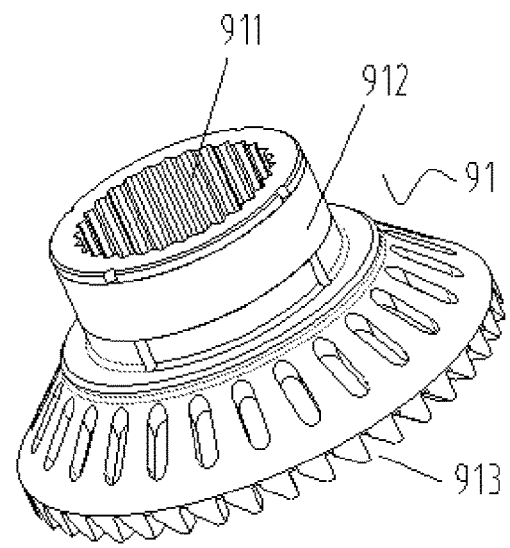
FIG. 16 is a schematic view showing the structure of slider of the present application.

Slider 91 comprises the upper connection part and the lower connection part. The upper connection part and the lower connection part can be fixedly connected as separate parts, or can be fixedly connected as one part. In order to be convenient for machining or mounting, preferably, as shown in FIG. 16, the upper connection part is tube structure, and the internal spline 911 sets inside its internal wall, and the magnetic iron ring 912 is formed as one part by plastic injection at the external wall, and the internal spline 911 and the external spline 711 at the external spline outside ring gear are sliding mated. The magnetic iron ring is mated with electromagnetic coil, so it can be away from electromagnetic coil under the magnetic force of electromagnetic coil; many tab teeth in certain space locating at the bottom end surface of the lower connection part, and the adjacent tab teeth forms teeth groove 913, and the teeth groove 913 matches to the teeth 33 at one end surface of driving frame. preferably, several material discharging chutes setting around the lower connection part is to reduce production cost.

When the electromagnetic coil is energized, under the repelling force of electromagnetic coil, it drives the magnetic iron ring moves downwards to be away from the electromagnetic coil, and the magnetic iron ring is fixedly connected to the upper part of slider, thereby under the magnetic iron ring, and it drives the whole slider 91 to slide downwards the external wall of slider and achieves the second locating position, now the teeth groove of the lower connection part of slider is mesh engaged with the teeth of driving frame, therefore, ring gear obtains the same rotation speed as the driving frame, which allows the transmission device to be locked; In opposite, when the electromagnetic coil is disengaged, the slider under the reaction force of spring mounting on ring gear moves upward along the external wall of ring gear to achieve the first locating position, now the teeth groove of the lower connection part is disengaged with the teeth of driving frame, which allows the transmission device to enter working condition.

Now the working conditions of washing and spinning of the washing machine with driving mechanism in the present embodiment is explained in detail as follows.

When spinning the washing clothes, the electromagnetic coil in clutch coil assembly is energized, and the electromagnetic coil and the magnetic iron ring 912 at outside of slider form an enclosed magnetic route. Now the slider slides downwards (the direction as shown in FIG. 1) along the external wall of ring gear under the magnetic repelling force. During the sliding process, the slider compresses the spring in ring gear, and many teeth groove at the lower connection part of slider and the teeth at one end of driving frame are engaged with each other, thereby it allows the slider and driving frame connected as one part, and the spin tube and driving frame are connected as one part, and it drives spin tube to obtain the same rotation speed as driving frame. Due to that the rotational inertia of the basket connected to spin tube is larger than the rotational inertia of impeller connected to wash shaft, so the spur gear and ring gear in the transmission device that fixedly connected by wash shaft and impeller are in lock status, which allows the transmission device to be locked status under the large rotational inertia of basket, so the whole transmission device can rotate together with the driving frame at high speed, thereby it drives wash shaft fixedly connected to the transmission device to rotate together with the driving frame at high speed, so the basket that connected with spin tube and the impeller that connected to wash shaft rotate at high speed, which realizing the spinning for washing clothes.

When washing clothes is in washing condition, the electromagnetic coil is de-energized, and the enclosed magnetic route formed by electromagnetic coil and slider disappears, and the slider is not under magnetic repelling force, so under the reaction force of spring, slider moves upwards along the external wall of ring gear, thereby many teeth grooves at the lower connection part of slider and the teeth at one end of driving frame is disengaged, so it drives the transmission device in speed reduction mechanism to enter working status:

As shown in FIG. 18, when the driving frame rotates around the axis of driving frame at high speed in counterclockwise direction (that is, the axis 50 of wash shaft as shown in FIG. 18, to be easy for description, it calls axis of wash shaft hereinafter), and it drives the eccentric sleeve 4 that fixedly connected to it to rotate in counterclockwise direction at the same high speed as axis of wash shaft, and the high speed rotation of eccentric sleeve drives the spur gear to rotate around axis of wash shaft to revolve eccentrically at high speed. During the high revolution of spur gear, and its external teeth is mesh engaged with the internal teeth of ring gear to interaction with each other, thereby it allows spur gear to rotate around the axis 40 of spur gear by itself, and the self rotation direction of spur gear is opposite to the rotation direction of eccentric sleeve, as shown in FIG. 18, the rotation direction of spur gear is clockwise direction, and its rotation speed is lower than the rotation speed of driving frame.

During the self rotation by the mesh engaged between spur gear and ring gear, and the ring gear rotates under its function, due to the teeth differences between the internal teeth of ring gear and the external teeth of spur gear, the ring gear rotates in opposite direction to the rotation direction of spur gear at low speed, and the counterclockwise direction as shown in FIG. 18. The slipper structure in transmission device also rotates together with the self rotation of spur gear. When the spur gear rotates around the axis of spur gear in clockwise direction at the speed that lower than the rotation speed of driving frame, the spur gear transfers the power by one pair of gear groove 62 setting above to one pair of the lower tab 852 setting in one pair of gear grooves by slipping, thereby it allows cross slipper to rotate together with spur gear in clockwise direction, and it drives the positioning slipper that one pair of grooves 863 slipping connected to one pair of the upper tab at the cross slipper to rotate in clockwise direction. Due to that the center of positioning slipper is fixedly connected to wash shaft, the positioning slipper rotates in clockwise direction, which drives wash shaft to rotate in clockwise direction with positioning slipper, and the direction by arrow inside as shown in FIG. 18.

As shown in FIG. 18, in washing condition, when the driving frame rotates at high speed, the transmission device in this embodiment can allows the spin tube that connected to ring gear and the impeller that connected to wash shaft to obtain a low speed that lower than the rotation speed of driving frame in the opposite direction, which solves the difficulty facing in current technology that the big energy consumption due to that fixing the spin tube during washing mode This embodiment is to place the speed reduction mechanism inside the inner rotor, which effectively use of the internal space of inner rotor. It is beneficial for the size of washing machine tends to be smaller in production. Also, in this embodiment, it uses slipper structure to connect the spur gear and wash shaft, which transfers the eccentric output from the spur gear around the axis of wash shaft to the coaxially output together with the wash shaft, which can prevent the speed reduction mechanism cause unnecessary vibration during working.

The Second Embodiment of the Present Application

Figure 8:
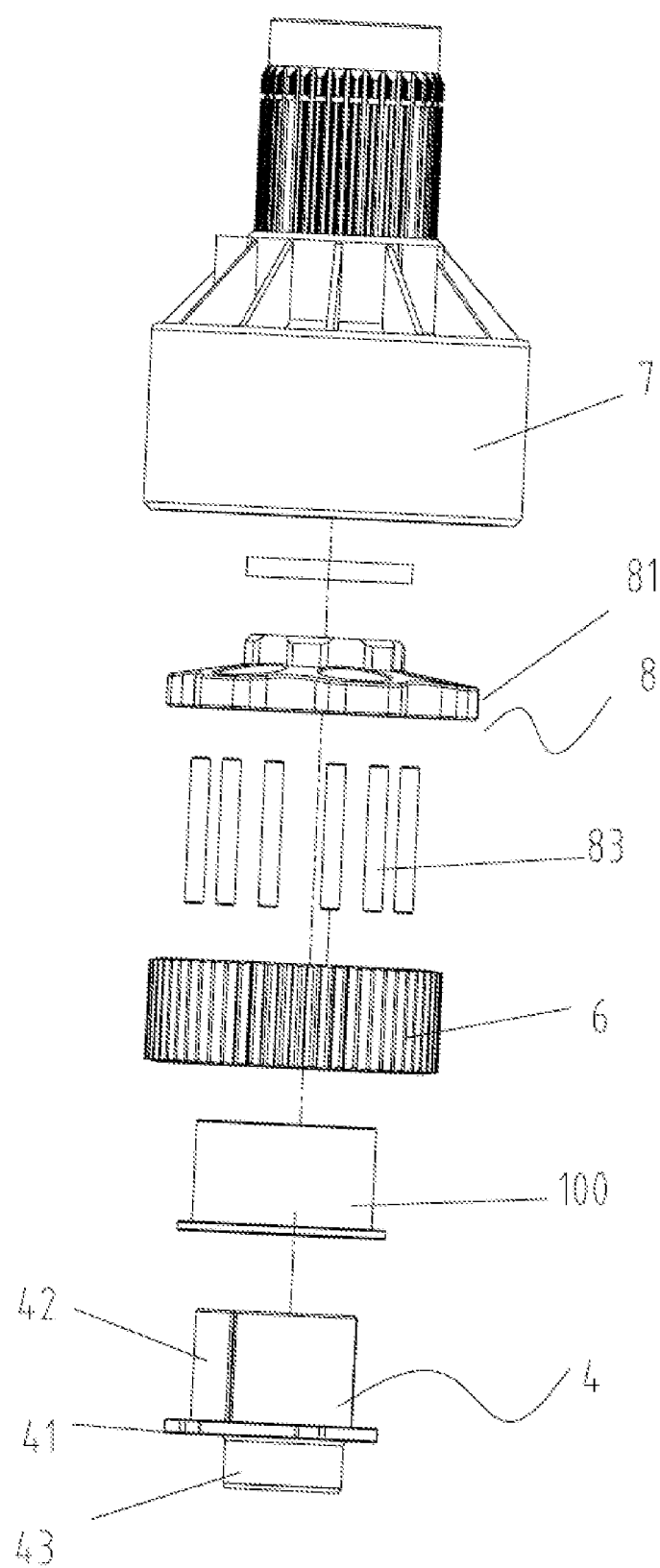
FIG. 8 is an exploded view showing the speed reduction mechanism (excluding the clutch coil assembly) according to a second embodiment of the present application.

As shown in FIGS. 7 and 8, it is a schematic view showing the structure of driving device of the washing machine with the structure of connection plate.

As shown in FIG. 7, the motor in this embodiment is inner rotor motor. In which, the inner rotor with empty cavity sets inside the housing assembly, and the speed reduction device sets inside the empty cavity of inner rotor, and the speed reduction device comprising the transmission device and the clutch coil device. In which, the transmission device comprising eccentric sleeve 4, spur gear 6, ring gear 7 and connection device 8. In this embodiment, the connection device is used the connection plate structure.

In this embodiment, the housing assembly, clutch coil device, the eccentric sleeve in transmission device, ring gear are all the same as in the first embodiment, so it will not be repeated here. Now only the connection device and the structure of the spur gear that connected to the connection device are described as follows.

Figure 11:
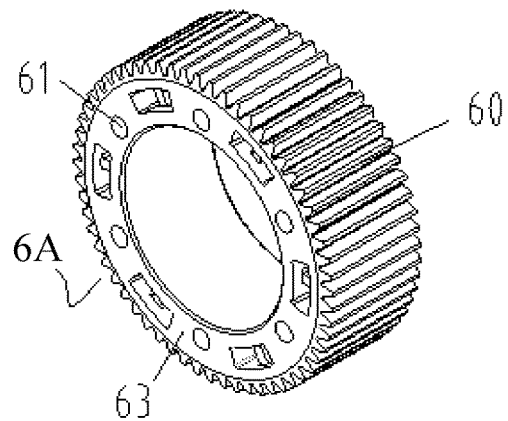
FIG. 11 is a schematic view showing the structure of spur gear according to a second embodiment of the present application.

As shown in FIG. 11, the spur gear 6A in this embodiment comprises steel ring 63 and the external tooth 60 that locates outside of steel ring and integrated with steel ring by plastic injection. The connection holes 61 are locating evenly around the steel ring for setting many connection shaft 83. In which, the steel ring is rotation connected to the first tube of eccentric sleeve, and the detailed connection approach is the same as the first embodiment, which will not be repeated here.

Figure 9:
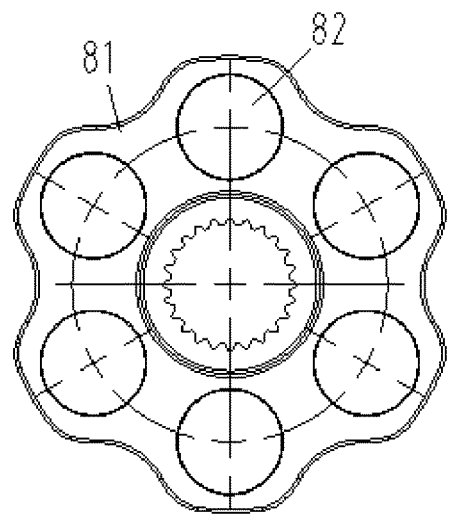
FIG. 9 is a schematic view showing the structure of connection plate according to a second embodiment of the present application.
Figure 10:
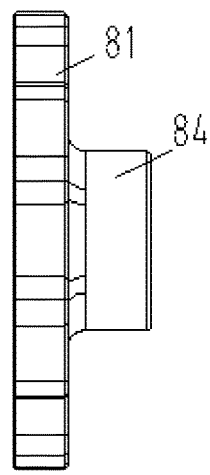
FIG. 10 is a right side view showing the connection plate as shown in FIG. 9.

The structure of the connection plate in this embodiment comprises the connection plate and many connection shafts that sliding contact with connection plate, it drives the connection plate to rotate by friction force. Specifically, as shown in FIGS. 8, 9, and 10, the connection plate has the body 81 of connection plate in plate shape, and its center goes through the wash shaft and fixedly connected to wash shaft. In order to enhance the connection with wash shaft, it can set one cylinder tube 84 at the middle part of the upper end of the body of connection plate, and it can fixedly connected to wash shaft by the tooth profile setting inside the internal wall of the cylinder. During manufacturing, the body of connection plate integrated formed with cylinder, or it can use welding to integrate them as one part. There are many through holes 82 locating around the body of connection plate evenly. Many connection shafts are setting inside each through hole and also sliding contacted with the through holes. Specifically, one end of each connection shaft is setting inside one through hole of the body of connection plate, and it slides along the internal wall of through hole. The other end of each connection shaft is fixedly setting inside one hole of connection shaft of the spur gear. In this embodiment, the number of the through hole of the body of connection plate and the number of connection shaft are all six, and the internal diameter of the through hole is bigger than the outside diameter of connection shaft. During mounting, firstly, to fixedly set the other end of the six connection shaft individually within the hole of six connection shafts of the spur gear, and then to fixedly set one end of the six connection shafts individually within the six through holes of the body of connection plate, and also ensure that the external surface of the six connection shafts individually tangent to the internal wall of six through holes in the opposite corresponding position.

The transmission device in this embodiment is to transfer the rotation power of inner rotor in the following running way.

When the electromagnetic coil in clutch coil device is energized, washing machine enters spinning status: Now the electromagnetic coil and the magnetic iron ring 912 setting outside of slider forms an enclosed magnetic route. Now the slider slides downwards (the downward direction as shown in FIG. 1) along the external wall of ring gear under the magnetic repelling force. During the sliding process, the slider compresses the spring in ring gear, and many teeth groove at the lower connection part of slider and the teeth at one end of driving frame are engaged with each other, thereby it allows the slider and driving frame connected as one part, and the spin tube and driving frame are connected as one part, and it drives spin tube to obtain the same rotation speed as driving frame. Due to that the rotational inertia of the basket connected to spin tube is larger than the rotational inertia of impeller connected to wash shaft, so the spur gear and ring gear in the transmission device that fixedly connected by wash shaft and impeller are in lock status, which allows the transmission device to be locked status under the large rotational inertia of basket, so the whole transmission device can rotate together with the driving frame at high speed, thereby it drives wash shaft fixedly connected to the transmission device to rotate together with the driving frame at high speed, so the basket that connected with spin tube drives the impeller that connected to wash shaft to rotate at high speed, which realizing the spinning for washing clothes.

When washing clothes is in washing condition, the electromagnetic coil is de-energized, and the enclosed magnetic route formed by electromagnetic coil and slider disappears, and the slider is not under magnetic repelling force, so under the reaction force of spring, slider moves upwards along the external wall of ring gear, thereby many teeth grooves at the lower connection part of slider and the teeth at one end of driving frame is disengaged, so it drives the transmission device in speed reduction mechanism to enter working status:

As shown in FIG. 18, when the driving frame rotates around the axis of driving frame at high speed in counterclockwise direction (that is, the axis 50 of wash shaft as shown in FIG. 18, to be easy for description, it calls axis of wash shaft hereinafter), and it drives the eccentric sleeve 4 that fixedly connected to it to rotate in counterclockwise direction at the same high speed as axis of wash shaft, and the high speed rotation of eccentric sleeve drives the spur gear to rotate around axis of wash shaft to revolve eccentrically at high speed. During the high revolution of spur gear, and its external teeth is mesh engaged with the internal teeth of ring gear to interaction with each other, thereby it allows spur gear to rotate around the axis 40 of spur gear by itself, and the self rotation direction of spur gear is opposite to the rotation direction of eccentric sleeve, as shown in FIG. 18, the rotation direction of spur gear is clockwise direction, and its rotation speed is lower than the rotation speed of driving frame.

During the self rotation by the mesh engaged between spur gear and ring gear, and the ring gear rotates under its function, due to the teeth differences between the internal teeth of ring gear and the external teeth of spur gear, the ring gear rotates in reverse direction to the rotation direction of spur gear at low speed, and the counterclockwise direction as shown in FIG. 18. Accompanied with the self rotation of spur gear, the connection plate structure of transmission device rotates according to the self rotation of spur gear, and it drives wash shaft to rotate in the same direction and at the same speed as spur gear, further, it transfers the eccentric output caused by that spur gear rotates around the axis of wash shaft eccentrically to output caused by that spur gear rotates along the axis of wash shaft direction.

Specifically, during the eccentrically rotation of spur gear, the six connection shafts fixedly mounting in the holes of the six connection shafts of spur gear synchronous rotates with it. As another end of the six connection shafts holding against the internal wall of the six holes in the body of connection plate and also rotates in circular within the internal wall, the six connection shafts drives the body of connection plate and also allows the body of connection plate to rotate synchronously together with the rotation of spur gear. But the round tube at the upper end surface of the body of connection plate is fixedly connected to wash shaft, when the body of connection plate rotates, it drives the wash shaft to do synchronous rotation. Thereby realizing to transfer the output caused by the spur gear eccentrically rotates deviated from the axis of wash shaft to the output in the same direction as axis of wash shaft.

As the structure of other parts mentioned in embodiment of the present application is the same as the structure of the first embodiment, and the work theory is the same, so will not repeat hereinafter.

For the driving device of washing machine in this present application, in order to prevent the endplay or displacement of wash shaft in axial direction, several snag rings or others that have the same function as snag ring shall be added in proper position of wash shaft or spin tube as mentioned in the first embodiment and the second embodiment; In order to be convenient for installation and bearing the load, washer or others that have the same function as washer shall be added in suitable position of wash shaft; In order to achieve the normal transmission relationship and mounting of the present application, many bushings and many ball bearings shall be setting in different sections, like setting many bushings between wash shaft and spin tube, and setting many ball bearings between ring gear and spin tube, mounting plate and spin tube, and end cover of motor and wash shaft, specifically, the above ball bearings can be deeply grooved ball bearings. Preferably, Sleeve can be setting between the ball bearing that between end cover of motor and wash shaft and wash shaft as the function of bushing. To prevent washing water from entering the interior of reducer and motor along wash shaft, spin tube and mounting plate, small seal is setting between wash shaft and spin tube, and big seal is setting between spin tube and mounting plate. Preferably, in order to realize vibration reducing and noise reducing while running, cushion pad made of plastic material or elastic material shall be added among assembly parts, and under the condition of achieving the mounting strength or the related functions, the housing assembly uses cast aluminum material, or ring gear uses plastic material.

Due to that the above snag ring, washer, bushing, ball bearing, sleeve, big seal, small seal, and vibration and noise cushion and etc. all the parts are the normal parts used by the person skilled in the art, a few of modifications and improvements may be made for the structure of the above parts in the present application shall not be considered as the novelty of this patent.

In addition to the above two embodiments, the gear reduction mechanism may have other embodiments. The present application also provides a washing machine, including any gear reduction mechanism in the first embodiment or the second embodiment of the present application, a washing machine that uses any one of gear reduction mechanism mentioned in the two embodiment of the present application, has compact structure, small volume, and convenient for product manufacturing in smaller size.

A double drive transmission method, mechanism, washing machine and washing method according to the present application is described in detail hereinafter. The principle and the embodiments of the present application are illustrated herein by specific examples. The above description of examples is only intended to help the understanding of the method and the spirit of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. A double drive transmission output method for a washing machine, comprising steps in the following sequences:
    fixedly connecting an input part of a speed reduction mechanism to a power part for providing rotational driving power;
    fixedly connecting a spinning output part of the speed reduction mechanism to a spin tube of the washing machine;
    connecting an agitating output part of the speed reduction mechanism to a wash shaft of the washing machine;
    by means of connecting the agitating output part to the input part, the agitating output part revolves around an axis of the power part;
    by means of meshing connection between the spinning output part and the agitating output part, the spinning output part and the agitating output part are caused to be interacting with each other and rotating separately on their own axis and driving the wash shaft and the spin tube to rotate individually;
    wherein the transmission among the input part of the speed reduction mechanism, the agitating output part, and the spinning output part are provided in plane;
    wherein the power part is a motor rotor or a pulley which has respectively a driving frame and a cavity within the driving frame;
    wherein the input part of the speed reduction mechanism is an eccentric sleeve which is mounted in the cavity and connected to the driving frame and rotates around the wash shaft.

2. The method of claim 1, wherein further comprising following steps:
    during rotation of the wash shaft, the wash shaft transfers a reactive force from a washing load to the agitating output part; and
    the agitating output shaft transfers the reactive force from the washing load to the spinning output part, then the interaction force between the agitating output part and the spinning output part is changed, so individual rotation speed of the agitating output part and the spinning output part varies with the washing load.

3. The method of claim 1, wherein the agitating output part comprises:
    a spur gear which is sleeved to an outside of the eccentric sleeve and connected rotationally to it, revolving around the axis of the eccentric sleeve with rotation of the eccentric sleeve;
    a connection device which connects the spur gear to the wash shaft or the spin tube.

4. The method of claim 3, wherein the spinning output part is a ring gear which is connected to the spin tube or the wash shaft, and in which the spur gear is placed such that during revolution, the spur gear rotates on its own axis as a result of its meshing with teeth of the ring gear, and drives the ring gear to rotate by itself.

5. A double drive transmission device of a washing machine, including a speed reduction mechanism being provided with an input part, a spinning output part and an agitating output part, wherein:
    the input parts fixedly connects to a power part which provides a rotation driving power;
    the spinning output part fixedly connects to a spin tube of the washing machine;
    the agitating output part fixedly connects to a wash shaft of the washing machine;

the agitating output part fixedly connects to the input part, so that the agitating output part revolves around the axis of the power part; and the spinning output part meshes with the agitating output part so that the spinning output part and the agitating output part interacts with each other and rotates separately around their own axis, as a result driving the wash shaft and the spin tube to rotate individually.

6. The device according to claim 5, wherein the power part is a motor rotor or a pulley which has respectively a driving frame and an empty cavity inside the driving frame.

7. The device according to claim 6, wherein the input part is an eccentric sleeve which is mounted inside the empty cavity, and connected to the motor rotor or the pulley, and rotates around the wash shaft.

8. The device according to claim 7, wherein the agitating output part comprising:

a spur gear which is sleeved on an outside of the eccentric sleeve and rotationally connected to it, revolving around the axis of the eccentric sleeve with the rotation of eccentric sleeve;

a connection device which connects the spur gear to the wash shaft or the spin tube.

9. The device of claim 8, wherein the spinning output part is a ring gear that is connected the spin tube or the wash shaft, and inside of which the spur gear is placed, so that during revolution, the spur gear rotates on its owns axis as a result of its meshing with the internal teeth of the ring gear, and drives the ring gear to rotate by itself.

10. A washing machine, wherein it comprises the device of claim 5.

11. A washing machine, wherein it comprises the device of claim 9.

* * * * *